(12) United States Patent
Yamaguchi

(10) Patent No.: US 7,188,868 B2
(45) Date of Patent: Mar. 13, 2007

(54) SEAT BELT PRETENSIONER

(75) Inventor: Hiroyoshi Yamaguchi, Yokohama (JP)

(73) Assignee: NHK Spring Co., Ltd., Kanagawa (JP)

( * ) Notice: Subject to any disclaimer, the term of this patent is extended or adjusted under 35 U.S.C. 154(b) by 429 days.

(21) Appl. No.: 10/487,493

(22) PCT Filed: Aug. 23, 2002

(86) PCT No.: PCT/JP02/08502

§ 371 (c)(1),
(2), (4) Date: Aug. 17, 2004

(87) PCT Pub. No.: WO03/018374

PCT Pub. Date: Mar. 6, 2003

(65) Prior Publication Data

US 2004/0256850 A1 Dec. 23, 2004

(30) Foreign Application Priority Data

Aug. 23, 2001 (JP) .............................. 2001-252951

(51) Int. Cl.
*B60R 22/36* (2006.01)
(52) U.S. Cl. ...................... 280/806; 280/807
(58) Field of Classification Search ............. 280/801.1, 280/803, 804, 805, 806, 807; 297/472, 478, 297/479, 480
See application file for complete search history.

(56) References Cited

U.S. PATENT DOCUMENTS

| | | | |
|---|---|---|---|
| 4,917,210 A | * | 4/1990 | Danicek et al. ............. 180/268 |
| 5,364,129 A | * | 11/1994 | Collins et al. ............. 280/806 |
| 5,450,723 A | | 9/1995 | Foehl et al. |
| 5,495,790 A | | 3/1996 | Greiner |

(Continued)

FOREIGN PATENT DOCUMENTS

DE 29710325 10/1998

(Continued)

*Primary Examiner*—Paul N. Dickson
*Assistant Examiner*—Toan C. To
(74) *Attorney, Agent, or Firm*—Marshall & Melhorn, LLC (57) ABSTRACT

In the seat belt pretensioner device according to the present invention, because the buckle is pulled by urging an intermediate point of the cable, it is possible to pull the seat belt and buckle by a required stroke with a relatively small stroke of the power actuator, and this contributes to a compact design of the device. Because the buckle can be pulled via a fixed point of a cable guide, the buckle and, hence, seat belt can be pulled in a stable manner, and a high level of reliability can be achieved. For instance when the power actuator comprises a piston rod that is pushed out by high pressure gas, because a high pressure gas can be produced with a relatively small device, the size and weight of the device can be minimized. By using a cushioning strucgture for gradually absorbing kinetic energy toward the terminal end of the motion of the power actuator, an inadvertent unlatching of the buckle owing to an impulsive movement of the buckle can be avoided, and an excessive reaction force is prevented from being transmitted to the pretensioner device. This reduces the need for a high mechanical strength, and contributes to compact design. Also, impulsive noises at the terminal end of the operation of the device can be minimized and the device can operate in a quite manner.

8 Claims, 7 Drawing Sheets

U.S. PATENT DOCUMENTS

| | | | |
|---|---|---|---|
| 5,564,748 A * | 10/1996 | Kmiec et al. | 280/806 |
| 5,588,608 A | 12/1996 | Imai et al. | |
| 5,725,249 A * | 3/1998 | Nishide et al. | 280/806 |
| 5,794,978 A * | 8/1998 | Nishide | 280/806 |
| 5,879,027 A | 3/1999 | Wier | |
| 5,897,140 A | 4/1999 | Wier | |
| 5,908,222 A | 6/1999 | Wier | |
| 5,911,440 A * | 6/1999 | Ruddick et al. | 280/806 |
| 5,927,756 A | 7/1999 | Wier | |
| 6,036,274 A | 3/2000 | Kohlndorfer et al. | |
| 6,039,353 A * | 3/2000 | Bauer et al. | 280/806 |
| 6,068,664 A | 5/2000 | Meyer et al. | |
| 6,094,913 A | 8/2000 | Wier | |
| 6,131,951 A * | 10/2000 | Chicken et al. | 280/806 |
| 6,139,058 A | 10/2000 | Bohmler | |
| 6,149,242 A * | 11/2000 | Pesta et al. | 297/480 |
| 6,206,423 B1 | 3/2001 | Wier | |
| 6,213,509 B1 | 4/2001 | Wier | |
| 6,250,720 B1 | 6/2001 | Wier | |
| 6,299,211 B1 | 10/2001 | Wier | |
| 6,419,271 B1 | 7/2002 | Yamada et al. | |
| 6,840,544 B2 * | 1/2005 | Prentkowski | 280/806 |
| 6,851,715 B2 * | 2/2005 | Devereaux et al. | 280/806 |
| 6,863,308 B2 * | 3/2005 | Motozawa | 280/806 |
| 7,118,132 B2 * | 10/2006 | Terasaki | 280/806 |

FOREIGN PATENT DOCUMENTS

| | | |
|---|---|---|
| EP | 0641691 | 3/1995 |
| EP | 0 663 326 B1 | 7/1995 |
| EP | 0 873 919 B1 | 10/1998 |
| JP | 54-163416 U | 11/1979 |
| JP | 58-177154 U | 11/1983 |
| JP | 10-035413 A | 2/1998 |
| JP | 10-044933 A | 2/1998 |
| JP | 10-044935 A | 2/1998 |
| JP | 10-035412 A | 7/1999 |
| JP | 2981393 B2 | 9/1999 |
| JP | 2000-326823 A | 11/2000 |
| JP | 2001-097183 A | 4/2001 |
| JP | 2001-219815 A | 8/2001 |
| JP | 3072446 U | 8/2001 |

* cited by examiner

SEAT BELT PRETENSIONER

TECHNICAL FIELD

The present invention relates to a pretensioner device for automatically increasing the tension of a seat belt in a vehicle crash situation or the like.

BACKGROUND OF THE INVENTION

A seat of an automobile is typically fitted with a seat belt to restrain the vehicle occupant and prevent him or her from being thrown forward by the inertia force in a frontal vehicle crash or the like. A seat belt is typically provided with an emergency locking retractor (ELR) device that locks up a winding shaft for the seat belt when the vehicle comes to a sudden stop or crashes with another vehicle or a stationary object while permitting the movement of the vehicle occupant in normal situations. An ELR device locks up the winding shaft immediately upon detecting a deceleration level exceeding a prescribed level to prevent the seat belt from being paid out any further.

However, simply locking up the winding shaft would not prevent a certain length of the seat belt from being paid out as the part of the seat belt wound around the winding shaft wraps the winding shaft tighter even though the winding shaft is locked up and kept stationary. To make up for such a shortcoming of the ELR device, various forms of seat belt pretensioner devices have been proposed. A seat belt pretensioner device, for instance, rapidly moves a seat belt buckle in a direction to increase the tension of the seat belt. As disclosed in Japanese patent laid open publication No. 10-35412, Japanese utility model registration publication No. 3072446 and Japanese patent publication No. 2981393, it is known to actuate such a pretensioner device by using a power actuator including a cylinder, a piston received in the cylinder and a high pressure gas generator so that the buckle may be pulled, via a cable, by the piston which is in turn driven by the pressure of the gas generated from the gas generator.

Such a pretensioner device is required to be capable of a reliable activation because it can be effective only by removing a slack from the seat belt. In the structure where the cable is drawn into a cylinder, it is difficult to reliably seal the gap between the opening of the cylinder and cable. Even with the sealing arrangement disclosed in Japanese utility model registration publication No. 3072446, gas may leak from the gap between the cable and cylinder opening, and the gaps within the cable itself. To make up for such a leakage of gas, a correspondingly large amount of propellant is required, and this causes an increase in the size of the device. To ensure an adequate travel of the buckle, the piston is required to have a relatively large stroke, and this also increases the size of the device. Using a larger amount of propellant also means a larger amount of CO gas emission, and this is not desirable either.

Such a pretensioner device is typically placed in a small space between a seat slide rail and a center console, and this severely limits the allowable size of the pretensioner device.

It is conceivable to use a rotary arm, bell crank or the like to transmit power in a desired direction, but they do not provide so much freedom in layout as the cable. Also, vehicle crashes are not limited to frontal crashes but may occur at oblique angles. Therefore, the direction in which the vehicle occupant is thrown forward at the time of a crash may vary depending on the direction of the crash. Therefore, depending on the direction of the crash, the direction of the force applied by the vehicle occupant to the seat belt and buckle may not be predictable, and the power transmission mechanism could be subjected to a bending moment. For the device to be capable of withstanding such a force or moment, the device must be increased in both size and weight.

BRIEF SUMMARY OF THE INVENTION

To eliminate such problems of the prior art, the present invention provides a seat belt pretensioner device for automatically increasing a tension of a seat belt in a vehicle crash or the like, comprising: a cable having one end connected to the seat belt buckle and another end fixed to a fixed part of a vehicle body; a power actuator adapted to urge an intermediate point of the cable so as to pull the seat belt in a direction to increase a tension of the seat belt in a vehicle crash or the like; and a rotary cable guide that supports a part of the cable extending between the point urged by the power actuator and buckle in both slidable and rotatable manner.

Thereby, in a vehicle crash or the like, the buckle can be driven in a retracting direction by the power actuator urging the intermediate point of the cable. If the buckle were simply pulled via the intermediate point of the cable at which the power actuator urges the cable, this intermediate point would follow the movement of the working end of the power actuator and the buckle also would move in the direction of the movement of the working end of the power actuator. On the other hand, according to the present invention, because the part of the cable extending between the point urged by the power actuator and buckle is supported by the rotary guide in both slidable and rotatable manner, the direction of pulling the buckle can be kept fixed by the rotary cable guide. Therefore, the mode of displacement of the buckle would not be affected by the operation of the power actuator so that the buckle and hence the seat belt can be pulled in a stable manner.

It is preferable if the power actuator comprises a fixed cylinder, a piston received in the cylinder, gas generating means for rapidly increasing an internal pressure of the cylinder and a piston rod adapted to be driven by the piston as the piston is actuated by an increase in the internal pressure of the cylinder to urge the intermediate point of the cable. Thereby, the seat belt can be pulled rapidly at the time of a vehicle crash or the like, and the vehicle occupant is prevented from being thrown forward from an early stage of the crash.

If the power actuator is provided with piston rod guide means for guiding the piston rod so as not to tilt when the piston rod is driven by the piston, the tendency of the piston rod to tilt as the piston rod is rapidly pushed out by the rapid increase of the gas pressure can be effectively controlled by the piston rod guide means.

It is preferable to use a cushioning structure for gradually absorbing energy of the power actuator as the power actuator approaches a terminal end of a motion thereof. Typically, the force that is required to unlatch a seat belt is in the order of 5 kgf (the force that is required to push a button to release the latch), and the deceleration that is applied to the button (or the buckle) may even reach a level in the order of 1,000 to 1,500 G when the pretensioner device comes to a stop following the activation thereof. The button is made of light material such as plastic material, but typically weighs 5 to 10 grams. Therefore, the deceleration level in the order of 1,000 to 1,500 G may apply a force exceeding 5 kgf to the button, and this could cause an inadvertent unlatching of the seat belt. This can be avoided by using a buckle that can absorb energy near the end of the activation stroke of the pretensioner, and prevent an impulsive deceleration to be applied to the buckle. This also prevents an excessive reaction to be applied to the seat belt itself, and this reduces the required mechanical strength and contributes to the reduction in the weight of the pretensioner device. Furthermore, the impulsive noises are minimized, and the pretensioner device can operate more quietly.

It is preferable if the cable is bent at the intermediate point engaged by the power actuator, and the device further comprises a cable retaining mechanical fuse for retaining an outer side of the bent portion of the cable so as to fixedly retain the buckle under normal situation, however, without substantially resisting an operation of the power actuator. Thereby, the cable is prevented from being pushed back by the force produced when latching the tongue plate of the seat belt into the buckle so that the position of the buckle can be kept stable during normal operation of the seat belt without applying any undue resistance to the cable when pulling the buckle into a retracted position or affecting the movement of the buckle at such a time.

It is preferable if a sleeve is fit on the one end of the cable, and is fixed in position by a metallic retaining member surrounding the sleeve and fixedly attached to the fixed part of the vehicle body. Thereby, the end of the cable adjacent to the fixed part of the vehicle body is increased in rigidity owing to the presence of the sleeve. Because the sleeve is retained by the metallic retaining member surrounding the sleeve, the tilting of the end of the cable adjacent to the fixed part of the vehicle body can be avoided, and the fixed part of the vehicle body may consist of a plate member having a relatively small thickness.

By using a one-way lock mechanism for allowing movement of the power actuator only in a direction to urge the cable, even when the operation of the power actuator is interrupted in an early phase of the crash, the buckle can be kept in the retracted position until the final phase of the crash and the seat belt can be kept in a tensioned state.

It is particularly preferable if the one-way lock mechanism is integrally incorporated in the power actuator because the rigidity of the connection between the two parts can be increased and the operation of the actuator and one-way lock mechanism can be effected in a stable manner.

These and other features and advantages of the present invention will become more apparent from the following description and appended drawings.

DETAILED DESCRIPTION OF THE PREFERRED EMBODIMENTS

Figure 1:
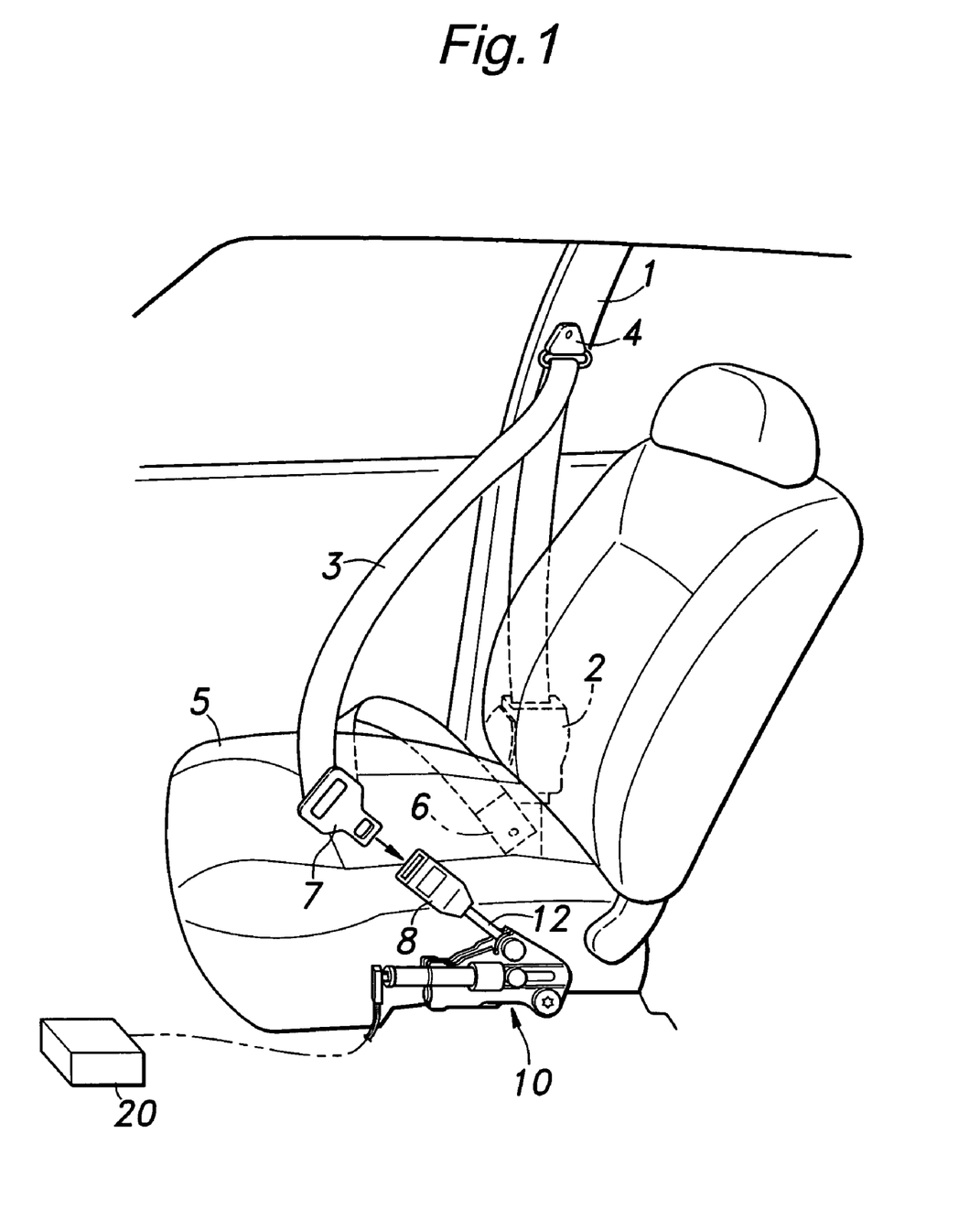
FIG. 1 is a perspective view of a vehicle seat incorporated with a seat belt pretensioner device embodying the present invention.

FIG. 1 is a perspective view showing a seat belt pretensioner device embodying the present invention, and a surrounding part thereof. A seat belt 3 is drawn upward from an ELR device 2 fixedly attached to a lower part of a center pillar 1 in a passenger compartment of an automobile. The seat belt 3 is then passed through a through ring 4 attached to an upper part of the center pillar 1, and extends downward. The free end 6 of the seat belt 3 is fixedly attached to a side of a rear part of a seat 5. A tongue plate 7 is provided on the part of the seat belt 3 extending between the through ring 4 and free end 6 so as to be moveable along the length of the seat belt 3. The side of the seat opposite to the side at which the free end 6 of the seat belt 3 is attached is provided with a pretensioner device 10 according to the present invention. The pretensioner device 10 is connected to a buckle 8.

The vehicle occupant seated in the seat 5 pulls out the seat belt 3 from the ELR device 2 and engages the tongue plate 7 with the buckle 8 so that the seat belt 3 is passed along the shoulder, chest and waist of the vehicle occupant.

Figure 2:
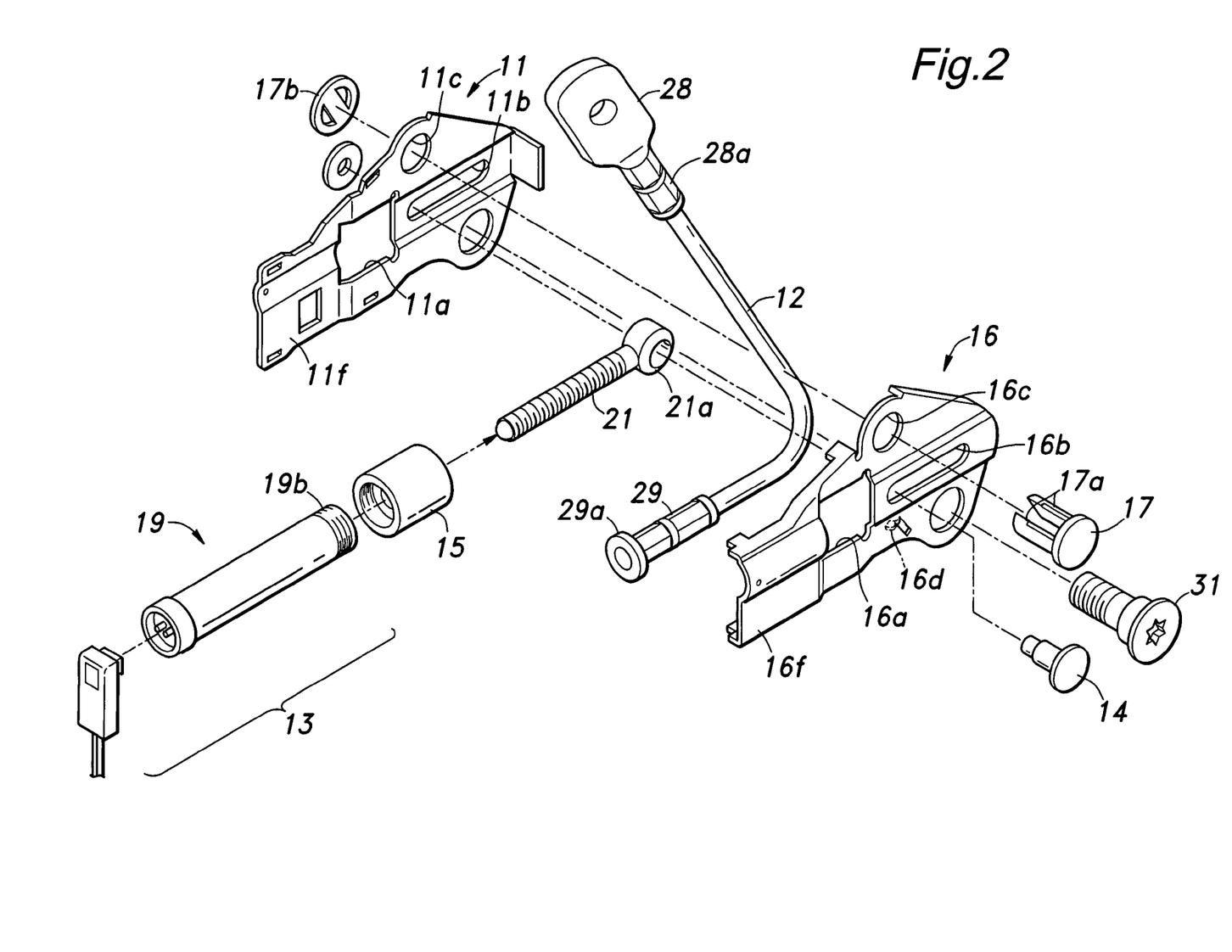
FIG. 2 is an exploded perspective view of the seat belt pretensioner device according to the present invention.
Figure 3:
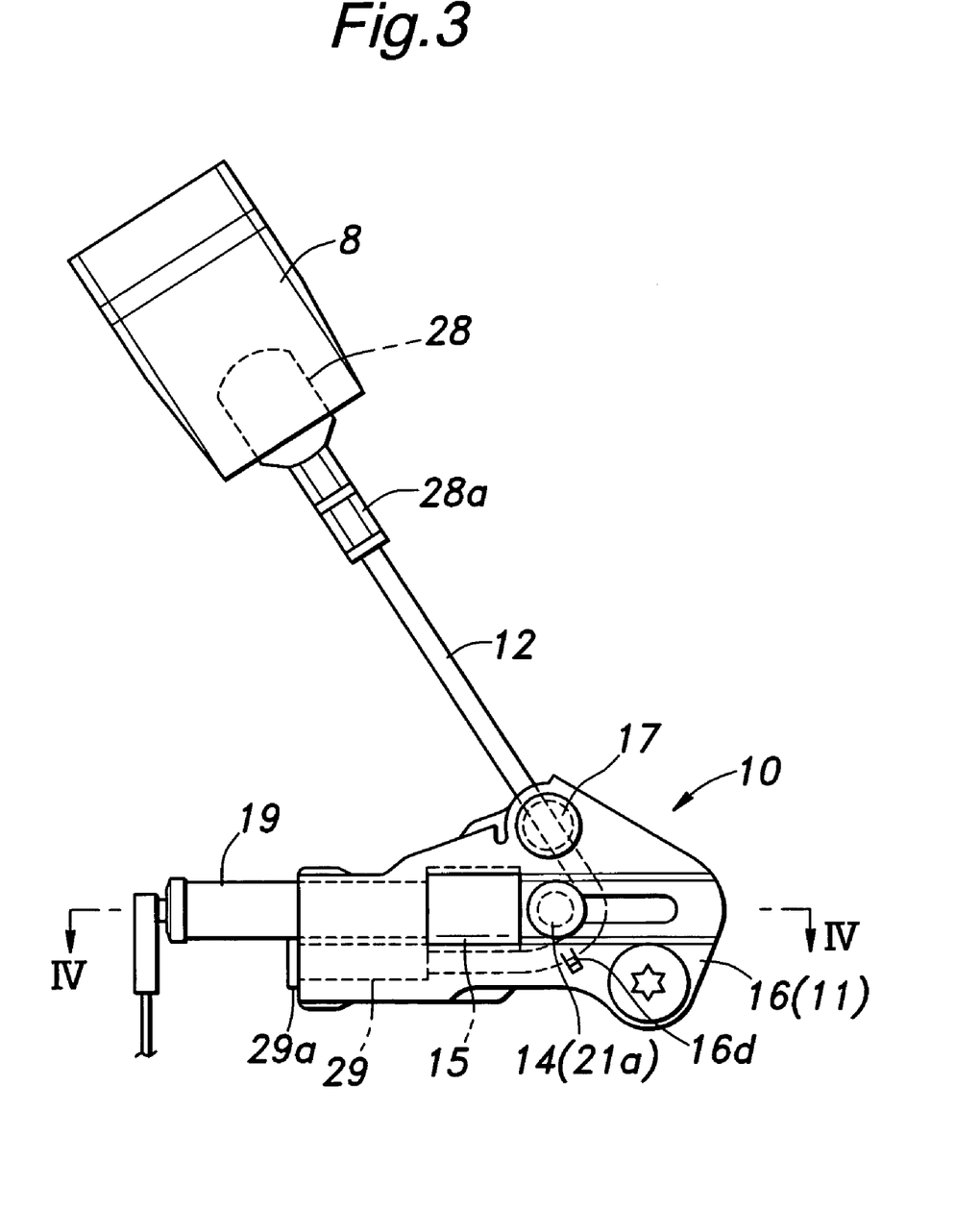
FIG. 3 is a side view of the seat belt pretensioner device according to the present invention.

The pretensioner device 10 automatically increases the tension of the seat belt 3 in case of a vehicle crash or the like, and, as illustrated in FIGS. 2 and 3, comprises a base plate 11 fixedly securing the entire device to a side of the seat 5, a cable 12 having one end fixedly attached to the base plate 11 and another end connected to an eye end 28 in the form of a plate member having a hole formed therein for connecting the buckle 8 thereto by using a threaded bolt. This eye end 28 is connected to the cable 12 via a sleeve 28a which is integrally attached to the corresponding end of the cable 12 by crimping. A power actuator 13 is fixedly attached to the base plate 11.

The power actuator 13 comprises a cylinder 19 and a piston rod 21. The projecting end of the piston rod 21 serving as the working end of the power actuator 13 is provided with an annular head 21a in the form of an eye bolt, and a guide pin 14 is passed through the annular head 21a. A one-way lock mechanism 15 for preventing the piston rod 21 from receding from the deployed position is provided on an end of the cylinder 19 adjacent to the working end in an integral manner. In the illustrated embodiment, a threaded portion 19b is formed on the outer circumferential surface of the corresponding end of the cylinder 19, and the one-way lock mechanism 15 is integrally connected to the cylinder 19 by threading the one-way lock mechanism 15 with this threaded portion 19b. Thereby, the relatively position between the cylinder 19 and one-way lock mechanism 15 can be kept fixed so that the piston rod 21 is enabled to move in a stable manner.

The base plate 11 is combined with a cover 16 that covers the one end of the cable 12, power actuator 13, guide pin 14 and one-way lock mechanism 15 in cooperation with the base plate 11, and thus forms a casing jointly with the base plate 11. The cover 16 is fixedly attached to the base plate 11 by passing tongues provided in suitable parts of the cover 16 into corresponding holes of the base plate 11 and crimping them. A fixing bolt 31 is passed through threaded bolt passing holes provided in the base plate 11 and cover 16 in a coaxial manner from the side of the cover 16, and threaded into a threaded hole (not shown in the drawings) provided in a corresponding part of the seat 5 so that the base plate 11 and cover 16 are held integral to each other and jointly attached to the seat 5.

Intermediate parts of the base plate 11 and cover 16 are formed with windows 11a and 16a for engaging parts of the one-way lock mechanism 15 provided on either side thereof. Because the cylinder 19 and one-way lock mechanism 15 are integrally joined to each other as described above, these windows 11a and 16a hold the one-way lock mechanism 15 from both sides against the large force that may be produced as a result of the activation of the piston rod 21 or the locking of the piston rod 21. Because the base plate 11 and cover 16 made of plate members can support such a load as a buckling load, even though the base plate 11 and cover 16 may be made of relatively thin plate members, an adequate mechanical strength can be ensured while minimizing the weight.

The axial force of the piston rod 21 may produce a bending moment with the edges of the windows 11a and 16 serving as pivotal points. However, because the piston rod 21 is located substantially at a middle point between the edges of the two windows 11a and 16, the bending moment is minimized, and an adequate mechanical strength can be ensured in spite of the small thickness of the base plate 11 and cover 16. Also, because the outer circumferential surface of the cylinder 19 is supported by the base plate 11 and cover 16 that surround the cylinder 19, the cylinder 19 is effectively prevented from tilting, and the action of the piston rod 21 is prevented from being impaired by the tiling of the cylinder 19.

The guide pin 14 is provided with a head in the form of an large diameter flange, and is passed through slots 11b and 16b formed in the base plate 11 and cover 16, respectively. The guide pin 14 is also passed through the annular head 21a of the piston rod 21 which was mentioned earlier, and is fixedly retained by crimping the free end of the guide pin 14 on the outer side of the base plate 11 into a radial flange (see FIG. 4). Therefore, the guide pin 14 is allowed to move only in the lengthwise direction of the slots 11b and 16b, and this provides a means for guiding the piston rod 21.

These slots 11b and 16b extend in the projecting direction of the piston rod 21 so that the piston rod 21 is guided by the engagement between the guide pin 14 and slots 11b and 16b as the piston rod 21 projects, and the piston rod 21 is forced to move only linearly. Also, because the projecting end of the piston rod 21 is guided in this manner, the tilting of the piston rod 21 can be avoided and the smooth movement of the piston rod 21 can be ensured.

A sleeve 29 is fit on the end of the cable 12 fixed to the fixed part of the vehicle body, and crimped thereon similarly as the end of the cable 12 adjacent to the buckle 8 (eye end 28). The sleeve 29 is interposed between the retaining portions 11f and 16f formed in the base plate 11 and cover 16, respectively, and is fixedly attached to the base plate 11 under a lower part of the power actuator 13. Because the retaining portions 11f and 16f forming integral parts of the base plate 11 and cover 16 surround the outer circumferential surface of the sleeve 29, they are fixedly attached to a fixed part of the vehicle body. The terminal end of the sleeve 29 is provided with an external radial flange 29a, and a part of the flange 29a is engaged by edges of the base plate 11 and cover 16 so that the cable 6 is kept fixed in position against the tension from the buckle 8.

Because the two sides of the sleeve 29 is retained by the retaining portions 11f and 16f, even when the sleeve 29 is pulled by the tension that is applied to the cable 12, the sleeve 29 is prevented from tilting laterally. The upper side of the sleeve 29 is retained by the cylinder 19 and the lower side of the sleeve 29 is retained by the bent portion of the base plate 11 and cover 16, the sleeve 29 is also prevented from tilting vertically. Because the base plate 11 and cover 16 support the load as a compressive or shear load, the base plate 11 and cover 16 can provide an adequate mechanical strength in spite of a small thickness thereof, and a required mechanical strength can be ensured with a minimum weight.

The cable 12 extends in parallel with the cylinder 19 along a lower side thereof, and reaches the annular head 21a of the piston rod 21. An intermediate point of the cable 12 is passed circumferentially around the outer circumferential surface of the annular head 21a so that the cable 12 loops back from the annular head 21a, and extends in the shape of letter V. The terminal end of the part of the cable 12 that extends from the annular head 21a in an obliquely upward direction is connected to the buckle 8 via the eye end 28.

A rotary cable guide 17 is provided in an upper end of the base plate 11 and cover 16 adjacent to a part of the cable 12 extending obliquely upward to guide a part of the cable 12 extending between the part of the cable 12 urged by the annular head 21a and buckle 8. The cable guide 17 is passed through circular holes 11c and 16c provided in the base plate 11 and cover 16, respectively.

The cable guide 17 in the illustrated embodiment comprises a main body having a pair of legs 17a extending axially in parallel to each other from a disk-shaped head, and a disk-shaped washer member 17b having a pair of holes for receiving the free ends of the legs 17a. By crimping the free ends of the legs 17a on the outer side of the washer member 17b, the main body and washer member 17b are integrally joined to each other, and the cable guide 17 is kept attached with respect to the circular holes 11c and 16c owing to the disk-shaped head of the main body and washer member 17b. Because the parts of the base plate 11 and cover 16 defining an opening from which the cable 12 extends are joined to each other by the cable guide 17, the mechanical strength of the base plate 11 and cover 16 against the load of the cable 12 moving into and out of the opening can be increased, and a damage to the base plate 11 and cover 16 can be effectively prevented.

The two legs 17a are spaced from each other so as to permit linear movement of the cable 12 between them. The cable guide 17 is supported by the circular holes 11c and 16c in a rotatable manner. Therefore, even when the direction along which the cable 12 extends changes, it can be accommodated by the rotation of the cable guide 17, and the intermediate part of the cable 12 can be favorably guided in spite of the angular changes of the cable 12. Therefore, the cable 12 is prevented from rubbing against sharp edges of the casing or otherwise receiving resistance against a linear movement thereof so that the cable can be pulled in an efficient manner and a correspondingly rapid retracting movement of the cable 12 is enabled.

The cover 16 is provided with a raised piece 16d that engages an intermediate part of the cable 12 so as to serve as a cable retaining mechanical fuse that prevents inadvertent movement of the cable 12. Referring to FIG. 3, the raised piece 16d is formed by raising a piece of the cover 16 so as to engage the outer circumferential surface of the bent portion of the cable 12 or the intermediate part of the cable 12 that is urged by the piston rod 21 via the annular head 21a. Thereby, even when the cable 12 is pushed in the retracting direction by fitting the tongue plate of the seat belt 3 into the buckle 8 to fasten the seat belt 3, a displacement of the cable 12 is prevented by the raised piece 16*d*. In other words, the position of the buckle 8 is kept fixed along the direction of fitting the tongue plate, the vehicle occupant is not encumbered by a discomfort that could result from the shifting of the position of the buckle 8 during normal use.

Figure 4:
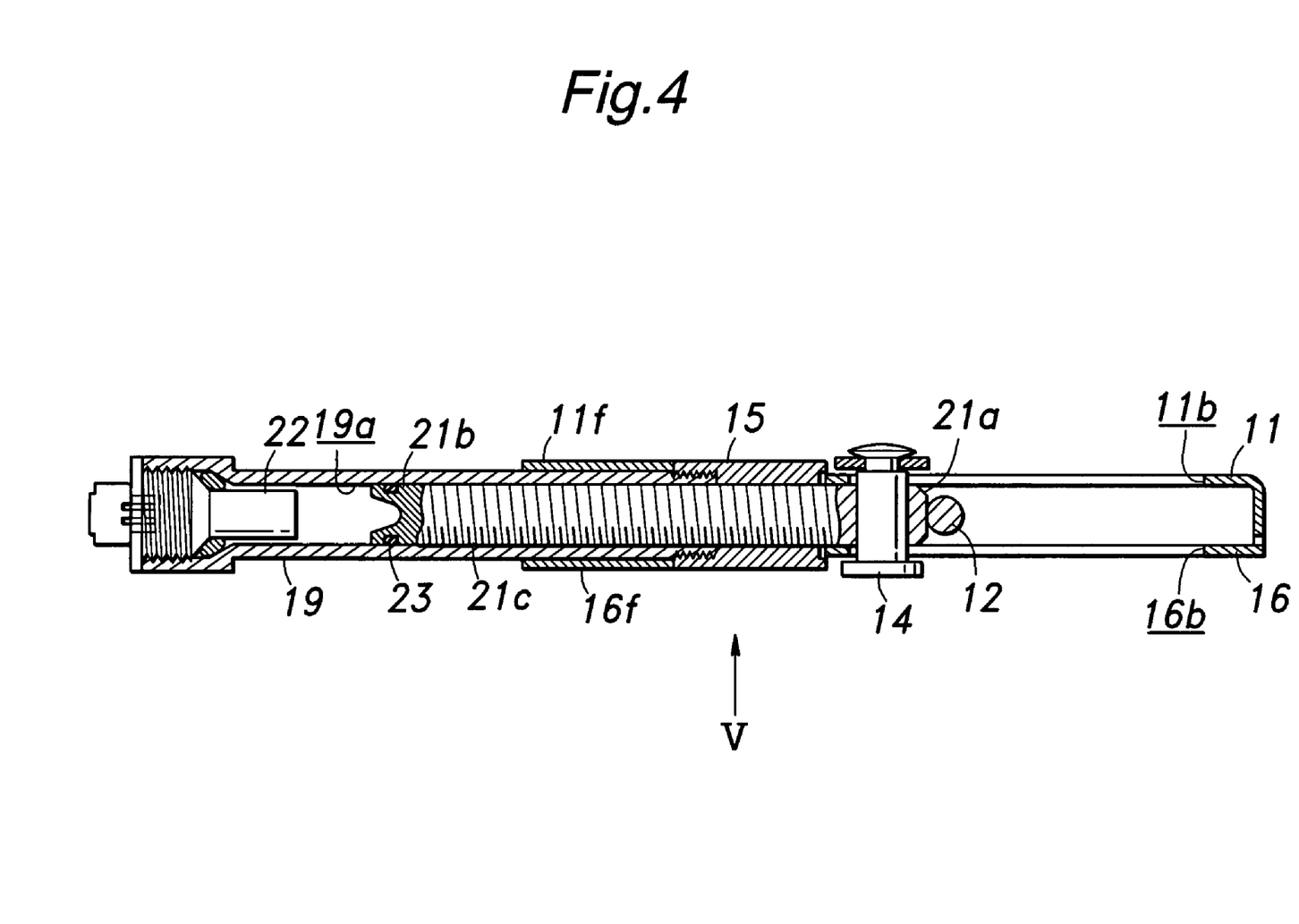
FIG. 4 is a sectional view showing the structure of the power actuator of the seat belt pretensioner device according to the present invention.

Referring to FIGS. 3 and 4, the power actuator 13 comprises a cylinder 19, a piston rod 21 axially moveably received in an inner bore 19*a* of the cylinder 19, and a gas generator 22 provided in a rear end of the cylinder 19 opposite to a piston member 21*b* engaging the retracting end of the piston rod 21. The projecting end of the piston rod 21 is provided with the annular head 21*a* that is located outside of the cylinder 19 as mentioned earlier. The outer circumferential surface of the piston member 21*b* is formed with a circumferential groove 21*b* which receives a resilient annular seal member 23. The seal member 23 may consist of any seal member as long as it is provided with an axial resiliency, and can prevent leakage of gas without fail.

The one-way lock mechanism 15 which is integrally attached to the cylinder 19 as mentioned earlier comprises a casing 25 surrounding the part of the piston rod 21 extending out of the cylinder 19, an engagement piece 26 received inside the casing 25 on one side of the piston rod 21 and adapted to selectively engage the outer circumferential surface of the piston rod 21, and a spring 27 for urging the engagement piece 26 away from the projecting end of the piston rod 21.

The outer circumferential surface of the piston rod 21 is formed with annular grooves (or ridges) or thread grooves (thread ridges) 21*a*, and the inner circumferential surface of the engagement piece 26 is provided with corresponding annular grooves (or ridges) or thread grooves (thread ridges) 26*a*. The outer circumferential surface of the engagement piece 26 facing away from the side provided with the thread grooves 26*a* is gradually reduced in diameter from the projecting end of the piston rod 21 to the retracting end thereof. The casing 25 internally defines a tapered portion 25*b* which is progressively reduced in diameter from the projecting to the retracting end.

The casing 25 also internally defines large diameter portion 25*a* next to the tapered portion 25*b* on the side of the projecting end of the piston rod 21, and the spring 27 mentioned earlier is received in the large diameter portion 25*a*. Therefore, the engagement piece 26 is normally urged by the spring 27 in the direction to ride over the tapered surface 25*b*, and this spring force causes the grooves 26*a* of the engagement piece 26 to engage with the grooves 21*c* of the piston rod 21*c*. Therefore, when an attempt is made to push the piston rod 21 into the cylinder, the grooves 21*c* and grooves 26*a* are even more firmly engaged with each other. As a result, the piston rod 21 is firmly secured by the one-way lock mechanism 15, and is kept fixed in position.

On the other hand, when the piston rod 21 moves in the projecting direction, the engagement piece 26 can move into the large diameter portion 25*a* and move away from the piston rod 21 even when engaged by the piston rod 21 so that the engagement piece 26 and piston rod 21 can be disengaged from each other.

During normal operation, as a tension is applied to the seat belt 3 which is connected to the buckle 8, the cable12 is pulled toward the buckle 8. In such a case, the piston rod 21 is subjected to a force that tends to push the piston rod 21 in the retracting direction. However, the piston rod 21 is fixedly secured against such a movement as mentioned earlier, and the buckle 8 would not be pulled out from the prescribed position. Therefore, no problem arises during normal operation of the seat belt.

Figure 5:
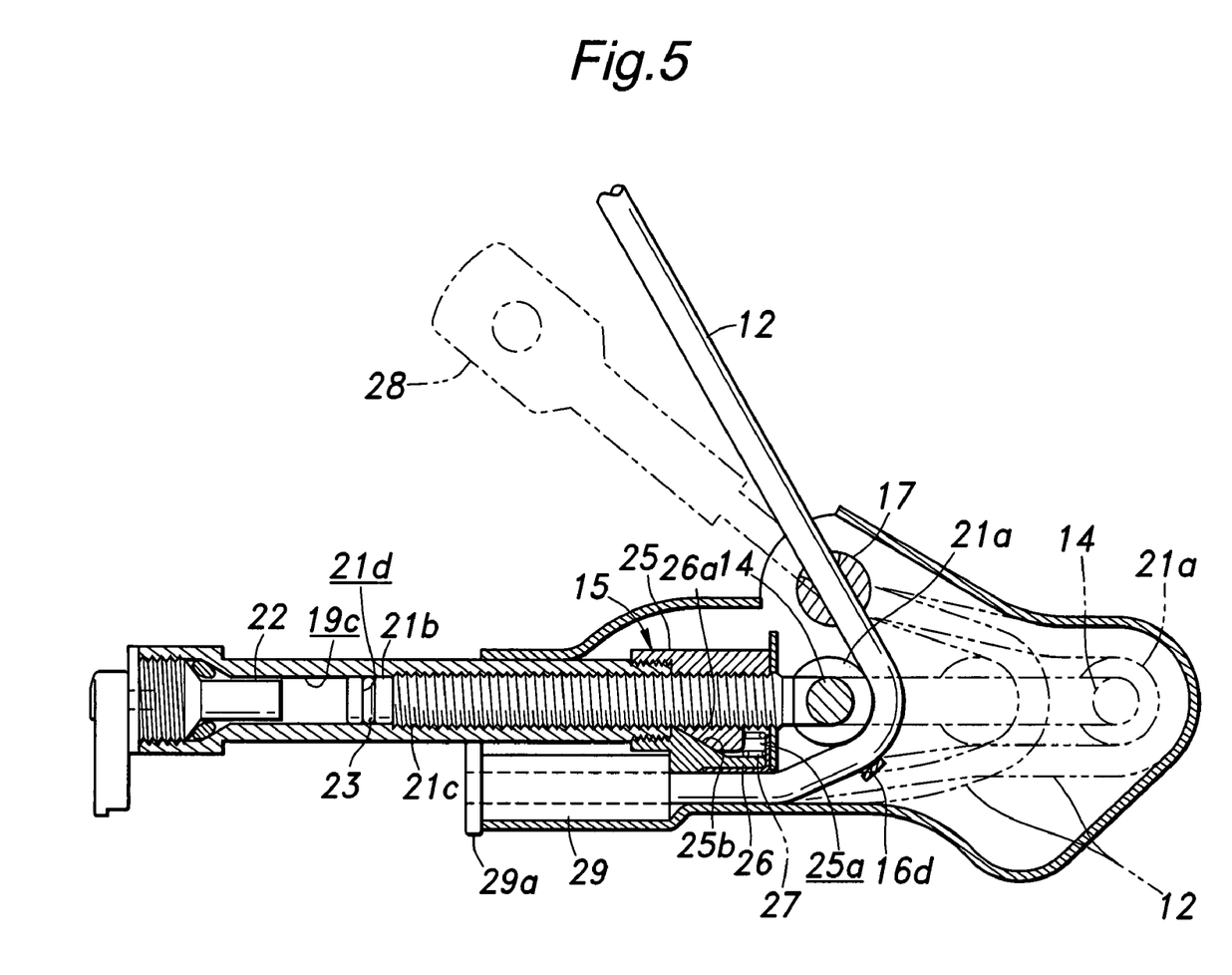
FIG. 5 is a view similar to FIG. 2 illustrating the mode of operation of the seat belt pretensioner device according to the present invention.

The mode of operation of the seat belt pretensioner device is described in the following with reference to FIGS. 3 to 5. When a vehicle crash is detected by a crash sensor 20 (FIG. 1) consisting of a G sensor or the like placed in a suitable part of the vehicle body, the gas generator 22 is ignited, and the pressure of the generated gas pushes the piston rod 21 forward causing the bent intermediate portion of the cable 12 connected to the annular head 21*a* formed in the free end of the piston rod 21 to be pushed aside. As a result, the part of the cable 12 urged by the piston rod 21 moves as indicated by the imaginary lines in FIG. 5 following the projecting movement of the piston rod 21. Because the part of the cable 12 fixed to the fixed part of the vehicle body (sleeve 29*a*) and cable guide 17 provided fixed points for the cable 12, the cable 12 deforms in such a manner than the opening angle of the V-shaped part of the cable 12 progressively decreases. The imaginary lines in the drawing show the intermediate and final states of the movement.

Because the buckle 8 is pulled by pushing the bent or looped back intermediate portion of the cable 12 while the one end of the cable 12 is fixedly secured to the fixed part of the vehicle body, the buckle 8 or seat belt 3 can be pulled by a large stroke with a relatively small stroke of the actuator. When projecting the piston rod 21 to pull the cable 12, the cable 12 can slip along the outer circumferential surface of the annular head 21*a*, the intermediate portion of the cable 12 can be directly pushed without using any external pulley or the like, and the number of components can be reduced.

The direction of guiding the movement of the cable 12 by the cable guide 17 changes owing to the deformation of the cable 12, but the cable guide 17 would not substantially resist the movement of the cable 12 in spite of the angular movement of the cable 12 because the cable guide 17 can rotate freely, and the cable 12 can be pulled smoothly. Because the point of the fixed part of the vehicle body from which the cable 12 is pulled is fixed in position, the seat belt 3 can be pulled in a stable manner, and the way the seat belt 3 is worn by the vehicle occupant would not be affected by the pulling of the seat belt 3. Also, the deformation of the cable 12 is favorably controlled at the time of the actuation of the device.

In this device, the cable 12 is pulled into a space between the base plate 11 and cover 16 by moving the part of the cable 12 which is engaged by the piston rod 21, and the piston rod 21 is rapidly pushed out by high pressure gas to pull the buckle 8. The resulting axial force of the piston rod 21 is so great that the raised piece 16*d* is bent out of the way of the cable 12 without substantially resisting the movement of the cable 12 caused by the movement of the piston rod 21. Because the raised piece 16*d* is formed by raising a part of a thin plate member, it can be bent back without requiring a large force. Therefore, it is possible to achieve a cable retaining mechanical fuse that would not be deformed by the external force normally produced by inserting the tongue plate of the seat belt 3 into the buckle 8 while providing almost no resistance to the large actuation force of the power actuator.

It is desirable to rapidly pull the seat belt 3 and restrain the vehicle occupant as soon as possible to prevent the vehicle occupant from being thrown forward in case of a vehicle crash. To achieve such a goal, the piston rod 21 is driven by the high pressure gas that rapidly increases in pressure. However, as the piston rod 21 comes to a stop at the end of the stroke of the piston rod 21, a large impulse and resulting noises are produced, and this may annoy the vehicle occupant. It can be avoided by providing a cushioning structure that gradually absorbs the kinetic energy of the piston rod 21 as it approaches the terminal end of the stroke thereof.

Figure 6:
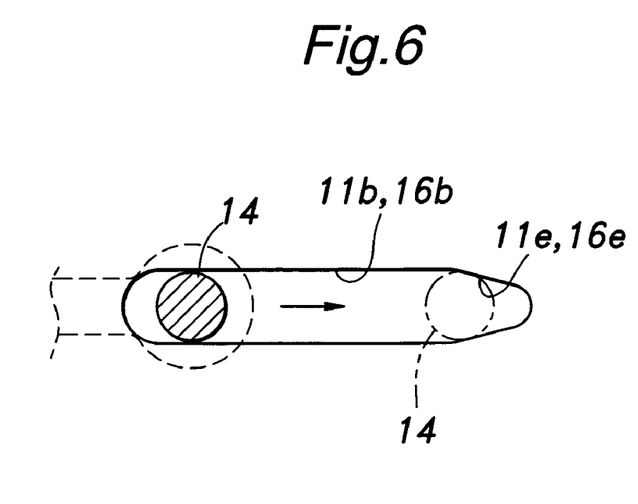
FIG. 6 is an enlarged fragmentary side view showing a modified embodiment of the seat belt pretensioner device according to the present invention.

Referring to FIG. 6, reduced width portions 11e and 16e are formed in the parts of the slots 11b and 16b corresponding to the terminal ends of the travel of the guide pin 14 (as indicated by the imaginary lines in the drawing). The reduced width portions 11e and 16e are each progressively reduced in width toward the terminal end. Thereby, the guide pin 14 is engaged by the reduced width portions 11e and 16e near the end of the stroke of the guide pin 14, and the widening deformation of the reduced width portions 11e and 16e absorbs the kinetic energy that may be left in the movement of the guide pin 14 so that the kinetic energy of the piston rod 21 is absorbed only gradually. As a result, the piston rod 21 rapidly moves until the guide pin 14 comes near the terminal point thereof to instantaneously pull the seat belt 3, but the kinetic energy which may have built up for the rapid movement of the seat belt 3 can be gradually reduced thereafter. Therefore, because the large impact that would be otherwise produced at the terminal end of the stroke of the piston rod 21 is prevented from being transmitted to the fixed part of the vehicle body or the buckle as a reaction force, the impact and impulsive noises at the terminal end of the operation of the device can be minimized, the need for a high mechanical strength can be mitigated, and the device can operate in a quite manner.

Figure 7:
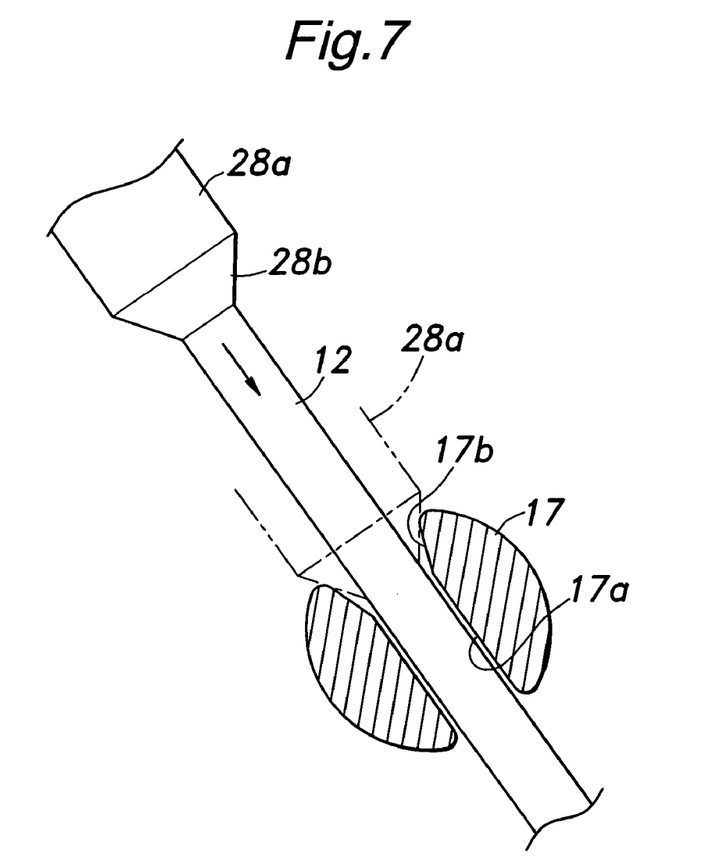
FIG. 7 is an enlarged fragmentary side view showing another modified embodiment of the seat belt pretensioner device according to the present invention.

FIG. 7 is an enlarged view of the cable guide incorporated with another embodiment of the cushioning mechanism for absorbing the energy of the seat belt pretensioner device. In this embodiment, a tapered portion 17b is formed in a part of the through hole 17a of the cable guide 17 adjacent to the buckle 8. The sleeve 28a of the eye end 28 provided on the base end of the buckle 8 is also provided with a tapered portion 28b having a smaller tapering angle than the tapered portion 17b so that the tapered portion 28b can fit into the tapered portion 17b. Thereby, during operation, these two tapered portions 17b and 28b engage each other in such a manner that the tapered portion 28b on the side of the buckle 8 force its way into the tapered portion 17b on the side of the cable guide 17, and progressively widens the tapered portion 17b while the force that pulls the cable 12 remains great enough. Therefore, owing to such an engagement between the two tapered portions 17a and 28b, the kinetic energy can be absorbed gradually toward the terminal end of the movement of the buckle, and a result similar to that of the previous embodiments can be achieved.

Figure 8:
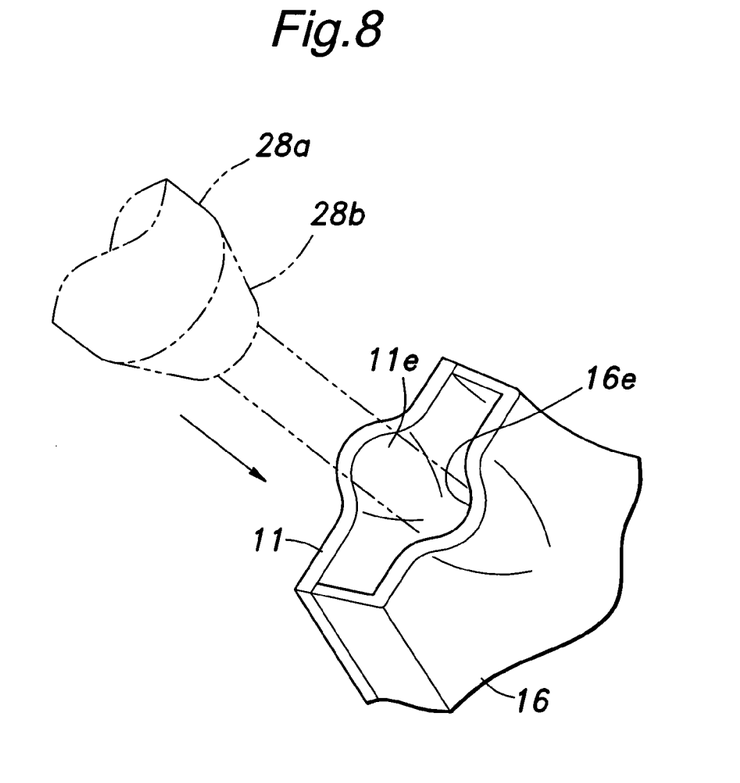
FIG. 8 is a fragmentary perspective view showing a part from which the cable extends.

FIG. 8 shows a third embodiment of the cushioning structure. In this embodiment, the parts of the base plate 11 and cover 6 from which the cable 12 extends toward the buckle 8 are provided with tapered recesses 11e and 16e that widen toward the buckle 8, and the buckle 8 is provided with a tapered portion 28b similar to that of the previous embodiment. The tapered recesses 11e and 16e are appropriately dimensioned such that the free end of the tapered portion 28b can fit into the tapered recesses 11e and 16e and provided with a tapering angle smaller than that of the tapered portion 28b. Therefore, as the tapered portion 28b is engaged by the tapered recesses 11e and 16e and moves in the direction to widen the tapered recesses 11e and 16e, the kinetic energy can be absorbed gradually toward the terminal end of the movement of the buckle 8, and a result similar to that of the previous embodiments can be achieved.

After the piston rod 21 has reached the terminal point of the projecting movement thereof, the seat belt 3 is placed under tension by the inertia force of the vehicle occupant. At such a time, the seat belt 3 should not be paid out any further. In the one-way lock mechanism 15 described earlier, because the engagement piece 26 is biased by the spring in the direction to cause the grooves 21c to engage with the grooves 26a, immediately following the end of the projecting movement of the piston rod 21, the engagement piece 26 can move in the direction to cause the grooves 21c to engage with the grooves 26a. Therefore, the piston rod 21 is locked up against a retracting movement immediately upon completion of the projecting movement thereof, and the seat belt 3 is prevented from being paid out any further. In the illustrated embodiment, the engagement between the piston rod 21 and engagement piece 26 is effected through the engagement between grooves 21c and 26a which are large in number in each case so that an adequate mechanical strength can be ensured, and the piston rod 21 can be locked up in a reliable manner.

Figure 9:
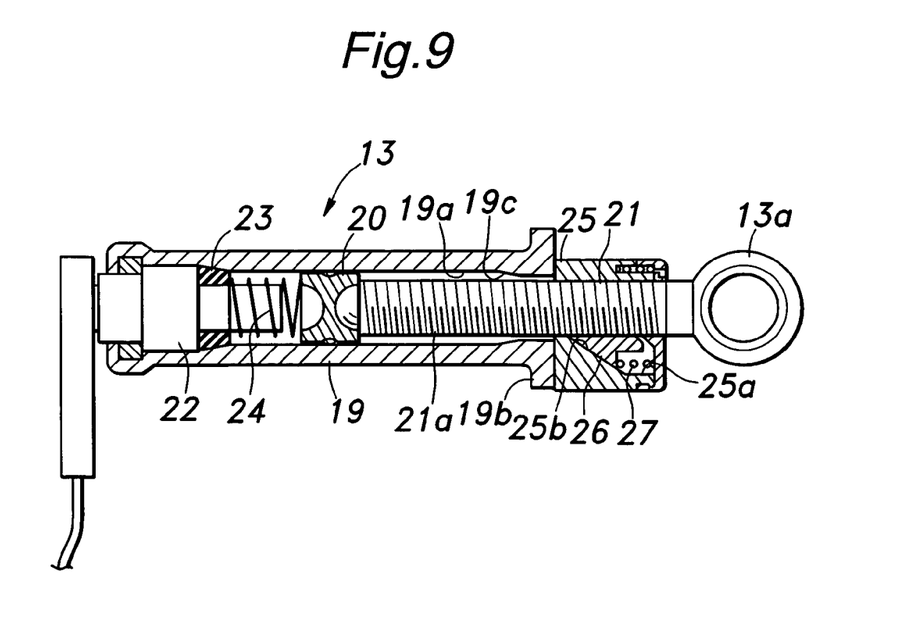
FIG. 9 is a longitudinal sectional view showing an alternate embodiment of the power actuator and one-way lock mechanism.

An alternate embodiment of the power actuator 13 and one-way lock mechanism 15 is illustrated in FIG. 9. The parts corresponding to those of the previous embodiments are denoted with like numerals in FIG. 9 without repeating the description of such parts. The power actuator 13 illustrated in FIG. 9 comprises a cylinder 19, a piston member 20 axially slidably received in the cylinder 19, a piston rod 21 having a base end engaged by the piston member 20 and a free end projecting out of the cylinder 19 to define the working end 13a, and a gas generator 22 received in a part of the cylinder 19 on the base end side of the piston member 20. A resilient seal member 23 and a compression coil spring 24 are interposed between the piston member 20 and gas generator 22 so that the piston member 20 is normally urged in the direction of operation (projecting direction) thereof.

The inner bore 19a of the cylinder 19 is provided with a tapered portion 19c serving as a cushioning structure that gradually decreases in diameter to progressively absorb energy from the piston member 20 toward a terminal end of its movement. Thereby, the kinetic energy of the piston member 20 is absorbed by the engagement between the piston member 20 and the tapered portion 19c and the resulting gradual deformation of the tapered portion 19c similarly as the cushioning structures of the foregoing embodiments. The seal member 23 is not limited to the illustrated embodiment, but may consist of any seal member as long as it provides a resiliency in the axial direction and can prevent leakage of gas without fail.

The free end of the power actuator 13 is provided with a one-way lock mechanism which comprises a casing 25 fixedly secured between the base plate 11 and cover 16 and surrounding the outer circumferential surface of the piston rod 21, an engagement piece 26 adapted to selectively engage the outer circumferential surface of the piston rod 21, and a spring 27 for urging the engagement piece 26 toward the base end of the piston rod 21 or toward the cylinder 19. The outer circumferential surface of the engagement piece 26 is gradually reduced in diameter from the free end of the piston rod 21 to the base end thereof. The casing 25 internally defines a large diameter portion 25a and a tapered portion 25b which is progressively reduced in diameter from the large diameter portion 25a.

Therefore, when the piston rod 21 moves in the projecting direction, the engagement piece 26 is forced in the projecting direction against the biasing force of the spring 27 and moves away from the piston rod 21 so that the piston rod 21 is allowed to move freely. On the other hand, when an attempt is made to move the piston rod 21 in the retracting direction, the engagement piece 26 moves toward the tapered portion 25b under the biasing force of the spring 27 and engages the outer circumferential surface of the piston rod 21 so that the piston rod 21 is prevented from moving. The outer circumferential surface of the piston rod 21 is formed with annular grooves (or ridges) or thread grooves (thread ridges) 21a, and the inner circumferential surface of the engagement piece 26 is provided with corresponding annular grooves (or ridges) or thread grooves (thread ridges). Therefore, when an attempt is made to move the piston rod 21 in the retracting direction, the inner circumferential surface of the engagement piece 26 and outer circumferential surface of the piston rod 21 firmly engage each other, and the piston rod 21 is securely kept fixed in position.

The power actuator 13 and one-way lock mechanism 15 of this embodiment operate similarly as those of the previous embodiments.

The seat belt pretensioner device was connected to the buckle in the foregoing embodiments, but it is also possible to connect the seat belt pretensioner device with the ELR device 2 although the parts that needs to be actuated may have a greater mass. The pretensioner device may be connected to a free end 6 of the seat belt 3 although the mode of operation may somewhat differ. The power actuator may also make use of other power sources such as a spring, instead of the gas generator.

In the foregoing embodiments, the piston rod that projects from the cylinder when activated pushes an intermediate point of the cable. However, the present invention is not limited by such embodiments, but may also use a piston rod that pushes an intermediate point of the cable as it retracts into the cylinder when activated. Although it was the buckle that was pulled in the foregoing embodiments, the present invention may be modified such that the seat belt anchor which is on the other end of the seat belt and normally fixed to the vehicle body is pulled in place of the buckle.

The invention claimed is:

1. A seat belt pretensioner device for automatically increasing a tension of a seat belt in a vehicle crash, comprising:
   a cable having one end connected to the seat belt buckle and another end fixed to a fixed part of a vehicle body;
   a power actuator adapted to urge an intermediate point of the cable so as to pull the seat belt in a direction to increase a tension of the seat belt in a vehicle crash; and
   a rotary cable guide that supports a part of the cable extending between the intermediate point urged by the power actuator and buckle in both a slidable and rotatable manner.

2. A seat belt pretensioner device according to claim 1, wherein the power actuator comprises a fixed cylinder, a piston received in the cylinder, gas generating means for rapidly increasing an internal pressure of the cylinder and a piston rod adapted to be driven by the piston as the piston is actuated by an increase in the internal pressure of the cylinder to urge the intermediate point of the cable.

3. A seat belt pretensioner device according to claim 2, wherein the power actuator is provided with piston rod guide means for guiding the piston rod so as not to tilt when the piston rod is driven by the piston.

4. A seat belt pretensioner device according claim 1, further comprising a cushioning structure for gradually absorbing energy of the power actuator as the power actuator approaches a terminal end of a motion thereof.

5. A seat belt pretensioner device according to claim 1, wherein the cable is bent at the intermediate point engaged by the power actuator, and the device further comprises a cable retaining mechanical fuse for retaining an outer side of the bent portion of the cable so as to fixedly retain the buckle under normal situation without substantially resisting an operation of the power actuator.

6. A seat belt pretensioner device according to claim 1, wherein a sleeve is fit on the one end of the cable, and is fixed in position by a metallic retaining member surrounding the sleeve and fixedly attached to the fixed part of the vehicle body.

7. A seat belt pretensioner device according to claim 1, further comprising a one-way lock mechanism for allowing movement of the power actuator only in a direction to urge the cable.

8. A seat belt pretensioner device according to claim 7, wherein the one-way lock mechanism is integrally incorporated in the power actuator.

* * * * *